United States Patent
Kodama et al.

(10) Patent No.: US 7,964,263 B2
(45) Date of Patent: Jun. 21, 2011

(54) BONDED ELEMENT, HONEYCOMB SEGMENT BONDED ELEMENT, AND HONEYCOMB STRUCTURE USING THE SAME

(75) Inventors: Suguru Kodama, Nagoya (JP); Takahiro Tomita, Chita (JP); Hiroki Fujita, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 116 days.

(21) Appl. No.: 12/239,343

(22) Filed: Sep. 26, 2008

(65) Prior Publication Data

US 2009/0041975 A1  Feb. 12, 2009

Related U.S. Application Data

(63) Continuation of application No. PCT/JP2007/056109, filed on Mar. 23, 2007.

(30) Foreign Application Priority Data

Mar. 30, 2006  (JP) .................................. 2006-094324

(51) Int. Cl.
- *B32B 3/12* (2006.01)
- *B01D 39/06* (2006.01)
- *B01D 39/00* (2006.01)
- *C04B 35/00* (2006.01)

(52) U.S. Cl. ............ 428/116; 55/523; 55/502; 501/153; 501/154

(58) Field of Classification Search .................. None
See application file for complete search history.

(56) References Cited

U.S. PATENT DOCUMENTS

| | | | |
|---|---|---|---|
| 2,637,675 A | 5/1953 | Bain | |
| 2,933,552 A | 4/1960 | Schurecht | |
| 4,090,881 A | 5/1978 | Keel et al. | |
| 5,547,749 A | 8/1996 | Chiba et al. | |
| 5,914,187 A | 6/1999 | Naruse et al. | |
| 6,669,751 B1 | 12/2003 | Ohno et al. | |
| 7,138,168 B2 | 11/2006 | Fujita | |
| 2002/0197193 A1 | 12/2002 | Harada et al. | |
| 2004/0045267 A1 | 3/2004 | Ichikawa et al. | |

(Continued)

FOREIGN PATENT DOCUMENTS

EP  0 965 735 A2  12/1999

(Continued)

OTHER PUBLICATIONS

Tomita et al.; U.S. Appl. No. 12/235,379, filed Sep. 22, 2008.

(Continued)

*Primary Examiner* — Gordon R Baldwin
(74) *Attorney, Agent, or Firm* — Oliff & Berridge, PLC

(57) ABSTRACT

There is disclosed a bonded element manufactured from a bonding material composition being capable of contributing to the lowering of thermal expansion of a bonding material layer sufficiently to relax any thermal stress generated in a honeycomb structure and largely inhibiting the cracking of the resultant honeycomb structure as well. In a bonded element in which two or more objects to be bonded are integrated via a bonding material layer, the bonding material layer having a Young's modulus of 20% or less of that of the objects to be bonded and having an average linear thermal expansion coefficient of 70% or less of that of the objects to be bonded, the bonding material layer being prepared from a bonding material composition composed mainly of fillers and a matrix in which fillers having an average linear thermal expansion coefficient of $2.0 \times 10^{-6} \cdot K^{-1}$ or less are contained.

17 Claims, 2 Drawing Sheets

U.S. PATENT DOCUMENTS

| | | | |
|---|---|---|---|
| 2004/0097370 A1* | 5/2004 | Ichikawa et al. | 502/439 |
| 2004/0144962 A1 | 7/2004 | Hayakawa et al. | |
| 2005/0011174 A1 | 1/2005 | Hong et al. | |
| 2005/0076626 A1* | 4/2005 | Kudo et al. | 55/523 |
| 2005/0079975 A1* | 4/2005 | Fujita | 502/439 |
| 2005/0109023 A1 | 5/2005 | Kudo et al. | |
| 2005/0221053 A1* | 10/2005 | Tomita et al. | 428/116 |
| 2005/0255288 A1* | 11/2005 | Noguchi et al. | 428/116 |
| 2006/0150597 A1 | 7/2006 | Masukawa et al. | |
| 2006/0166820 A1 | 7/2006 | Ogyu et al. | |
| 2006/0216466 A1 | 9/2006 | Yoshida | |
| 2006/0216467 A1 | 9/2006 | Yoshida | |
| 2006/0228520 A1 | 10/2006 | Masukawa et al. | |
| 2006/0230732 A1 | 10/2006 | Kunieda | |
| 2006/0290036 A1 | 12/2006 | Kaneda et al. | |
| 2007/0039298 A1 | 2/2007 | Tokumaru | |
| 2007/0092692 A1 | 4/2007 | Masukawa et al. | |
| 2007/0160825 A1 | 7/2007 | Miyakawa et al. | |
| 2008/0138568 A1 | 6/2008 | Tomita et al. | |
| 2008/0152863 A1 | 6/2008 | Tomita et al. | |
| 2008/0248238 A1 | 10/2008 | Tomita et al. | |
| 2009/0041975 A1 | 2/2009 | Kodama et al. | |
| 2009/0202779 A1 | 8/2009 | Yoshida | |

FOREIGN PATENT DOCUMENTS

| | | |
|---|---|---|
| EP | 1 142 619 A1 | 10/2001 |
| EP | 1 452 511 A1 | 9/2004 |
| EP | 1 479 882 A1 | 11/2004 |
| EP | 1 508 355 A1 | 2/2005 |
| EP | 1 508 356 A1 | 2/2005 |
| EP | 1 508 357 A1 | 2/2005 |
| EP | 1 508 358 A1 | 2/2005 |
| EP | 1 612 197 A1 | 1/2006 |
| EP | 1 964 823 A1 | 9/2008 |
| JP | B2-2-3121497 | 10/2000 |
| JP | A-2001-162119 | 6/2001 |
| JP | A-2001-190916 | 7/2001 |
| JP | A-2002-177719 | 6/2002 |
| JP | A-2004-283669 | 10/2004 |
| JP | A-2005-154202 | 6/2005 |
| KR | 2006-84403 A | 7/2006 |
| KR | 2006-93106 A | 8/2006 |
| WO | WO 03/048072 A1 | 6/2003 |
| WO | WO 03/067041 A1 | 8/2003 |
| WO | WO 03/067042 A1 | 8/2003 |
| WO | WO 2005/030364 A1 | 4/2005 |
| WO | WO 2006/075805 A1 | 7/2006 |
| WO | WO 2006/103786 A1 | 10/2006 |
| WO | WO 2007/111279 A1 | 10/2007 |
| WO | WO 2007/116665 A1 | 10/2007 |

OTHER PUBLICATIONS

Apr. 29, 2010 Extended European Search Report issued in European Patent Application No. EP 07 73 9550.
Feb. 23, 2010 Office Action issued in U.S. Appl. No. 12/138,076.
Sep. 17, 2010 Office Action issued in U.S. Appl. No. 12/138,076.
Jun. 25, 2010 Office Action issued in U.S. Appl. No. 11/951,682.
Oct. 29, 2010 Office Action issued in U.S. Appl. No. 11/951,682.
Mar. 7, 2011 Office Action issued in U.S. Appl. No. 11/951,682.
Feb. 2, 2011 European Search Report issued in European Patent Application No. 07 25 4730.0.
Aug. 6, 2010 Office Action issued in U.S. Appl. No. 11/962,965.
Jan. 7, 2011 Office Action issued in U.S. Appl. No. 11/962,965.
XANTHOS, Functional Fillers for Plastics, 2010, Wiley-Vch (Publisher), $2^{nd}$ edition, pp. 22-23.
MNX: http://www.memsnet.org/materials/siliconcarbidesic/ (Nov. 21, 2001).
Ciullo, Peter A., Industrial Minerals and Their Uses: A Handbook and Formulary, 1996, Noyes Publications, p. 343.
Shimomura et al., Journal of Materials Science, vol. 30, 1995, pp. 3193-3199.
Mar. 4, 2011 Office Action issued in U.S. Appl. No. 12/235,379.
Mar. 3, 2011 Office Action issued in U.S. Appl. No. 12/138,076.

* cited by examiner

BONDED ELEMENT, HONEYCOMB SEGMENT BONDED ELEMENT, AND HONEYCOMB STRUCTURE USING THE SAME

TECHNICAL FIELD

The present invention relates to a ceramic structure in which a plurality of ceramic members are bonded together. More particularly, it relates to a bonded element preferably for use in a honeycomb structure in which a plurality of honeycomb segments are integrally bonded, and a honeycomb segment bonded element.

BACKGROUND ART

A honeycomb structure is used as a trap filter for an exhaust gas in trapping and removing, for example, a particulate matter (particulates) included in the exhaust gas from a diesel engine or the like, and is incorporated for use as a diesel particulate filter (DPF) in an exhaust system of the diesel engine or the like.

Such a honeycomb structure has, for example, a structure in which a plurality of cells divided by porous partition walls made of silicon carbide (SiC) or the like to form fluid flow paths are arranged in parallel with one another in a central axis direction. Moreover, the ends of the adjacent cells are plugged alternately (in a checkered pattern). That is, one end of one of the cells opens and the other end of the one cell is plugged, whereas one end of another cell adjacent to this one cell is plugged and the other end of the other cell opens.

According to such a structure, the exhaust gas which has flowed into a predetermined cell (an inflow cell) from one end of the cell is transmitted through one of the porous partition walls and is discharged through a cell (an outflow cell) adjacent to the inflow cell. When the exhaust gas is transmitted through the partition wall, the particulate matter (particulates) in the exhaust gas is trapped by the partition wall, whereby the exhaust gas can be purified.

To continuously use such a honeycomb structure (the filter) for a long period, the filter needs to be regenerated. That is, to eliminate the increase of a pressure loss generated by the particulates deposited in the filter with an elapse of time, the particulates deposited in the filter need to be burned and removed. There has been a problem that during this filter regeneration, a large thermal stress is generated to cause defects such crack and destruction in the honeycomb structure. To meet a demand for the improvement of thermal shock resistance against such a thermal stress, there is suggested a honeycomb structure having a divided structure in which a plurality of honeycomb segments are integrally bonded via bonding material layers to impart, to the structure, a function of scattering and relaxing the thermal stress, so that the thermal shock resistance can be improved to a certain degree. In the honeycomb structure having such a divided structure, a plurality of honeycomb segments each having a shape constituting a part of the whole structure are assembled in a direction vertical to the central axis to constitute the whole structure. The honeycomb segments are integrally bonded via the bonding material layers to form a honeycomb segment bonded element so that the whole sectional shape cut along a plane vertical to the central axis is a predetermined shape such as a circular shape. Afterward, the outer peripheral surface of the honeycomb segment bonded element is coated with a coating material.

In recent years, a demand for further enlargement of the size of the filter has risen, and the thermal stress generated during regeneration has increased. To prevent the above-mentioned defects, the improvement of the thermal shock resistance of the structure has strongly been demanded. Above all, it is demanded that in the bonding material layers for integrally bonding the plurality of honeycomb segments, excellent stress relaxing function and bonding strength are realized to realize the honeycomb structure having excellent thermal shock resistance.

To solve such a problem, for example, a honeycomb structure is disclosed in which a bonding material layer material forming the bonding material layer between the honeycomb segments satisfies at least one of conditions that the material has a Young's modulus of 20% or less of that of a honeycomb segment material and that the material strength of the bonding material layer is smaller than that of the honeycomb segment, that is, the bonding material (the bonding material layer material) having a small Young's modulus and configured to relax the thermal stress is used, whereby an only small thermal stress is generated during actual use, and the honeycomb structure has such a durability that any crack is not generated (see Patent Document 1).

Moreover, a honeycomb filter for purifying an exhaust gas is disclosed in which a plurality of columnar porous ceramic members provided with a large number of through holes separated by the partition walls and arranged in a longitudinal direction are bonded together via adhesive layers. An adhesive layer thermal expansion coefficient $\alpha_L$ and a porous ceramic member thermal expansion coefficient $\alpha_F$ have a relation of $0.01 < |\alpha_L - \alpha_F|/\alpha_F < 1.0$, whereby a local temperature change occurs between the porous ceramic members. In consequence, the generated thermal stress can be relaxed, and any crack is not generated. The filter has excellent strength and durability (see Patent Document 2).

However, the lowering of the Young's modulus of the bonding material (the bonding material layer material) disclosed in Patent Document 1 is effective for relaxing the thermal stress generated during the actual use, but there has been a problem that the lowering of the Young's modulus cannot sufficiently realize the relaxing of the thermal stress generated in the honeycomb structure.

On the other hand, as to the bonding material (the material constituting the adhesive layers) disclosed in Patent Document 2, the thermal expansion coefficient of the honeycomb segment is not equal to that of the bonding material, whereby the generated thermal stress is relaxed. However, even in a case where the thermal expansion coefficient of the bonding material is not equal to that of the honeycomb segment, when the thermal expansion coefficient of the bonding material is higher than that of the honeycomb segment, there is a problem that the thermal stress generated in the honeycomb filter increases. Moreover, when a carbide or a nitride is used in a filler, there is a problem that it cannot be expected that the thermal expansion is lowered sufficiently to relax the thermal stress generated in the honeycomb filter.

Patent Document 1: Japanese Patent Application Laid-Open No. 2001-190916

Patent Document 2: International Patent Application Publication No. 2003-067042

DISCLOSURE OF THE INVENTION

The present invention has been developed in view of the above-mentioned problems of the conventional technology, and an object thereof is to provide a bonded element prepared from a bonding material composition capable of contributing to the lowering of thermal expansion of a bonding material layer sufficiently to relax a thermal stress generated in a honeycomb structure and capable of largely inhibiting the cracking of the resultant honeycomb structure.

To achieve the above object, according to the present invention, a bonded element, a honeycomb segment bonded element and a honeycomb structure using the bonded element are provided as follows.

[1] A bonded element in which two or more objects to be bonded are integrated via a bonding material layer, the bonding material layer having a Young's modulus of 20% or less of that of the bonded objects and having an average linear thermal expansion coefficient of 70% or less of that of the bonded objects, the bonding material layer being prepared from a bonding material composition composed mainly of fillers and a matrix in which fillers having an average linear thermal expansion coefficient of $2.0 \times 10^{-6} \cdot K^{-1}$ or less are contained.

[2] The bonded element according to [1], wherein the bonding material layers have an average linear thermal expansion coefficient of $2.5 \times 10^{-6} \cdot K^{-1}$ or less.

[3] The bonded element according to [1] or [2], wherein the bonding material layers have porosities in a range of 25 to 85%.

[4] The bonded element according to any one of [1] to [3], wherein the fillers having the average linear thermal expansion coefficient of $2.0 \times 10^{-6} \cdot K^{-1}$ or less are of at least one type selected from the group consisting of cordierite, amorphous silica, aluminum titanate and zirconium phosphate.

[5] The bonded element according to any one of [1] to [4], which contains inorganic fibers as the fillers.

[6] The bonded element according to [5], wherein the inorganic fibers are of at least one type selected from the group consisting of aluminosilicate fibers, alumina fibers, magnesium silicate fibers and calcium magnesium silicate fibers.

[7] The bonded element according to any one of [1] to [6], which contains plate-like particles as the fillers.

[8] The bonded element according to [7], wherein the plate-like particles are of at least one type selected from the group consisting of boron nitride, talc, mica and glass flakes.

[9] The bonded element according to any one of [1] to [8], wherein the volume fraction of the fillers occupied in the bonding material composition is in a range of 20 to 80%.

[10] The bonded element according to any one of [1] to [9], wherein the matrix is an inorganic adhesive.

[11] The bonded element according to [10], wherein the inorganic adhesive is colloidal silica.

[12] The bonded element according to any one of [1] to [11], which contains, as a sub-component of the bonding material composition, at least one selected from the group consisting of an organic binder, a resin balloon, a smectite-based clay, a dispersant and water.

[13] The bonded element according to any one of [1] to [12], which contains 0.1 to 5 mass % of resin balloon as the sub-component of the bonding material composition.

[14] The bonded element according to any one of [1] to [13], which contains 0.1 to 5 mass % of smectite-based clay as the sub-component of the bonding material composition.

[15] The bonded element according to any one of [1] to [14], wherein the bonding material composition contains 16 to 40 mass % of water content.

[16] A honeycomb segment bonded element which is prepared by bonding a plurality of honeycomb segments together by use of a composition for use in the bonding material layers of the bonding material according to any one of [1] to [15].

[17] A honeycomb structure which is prepared using the honeycomb segment bonded element according to [16].

As described above, the bonded element in which the bonding material composition if the present invention is used can contribute to the lowering of the thermal expansion of the bonding material layers sufficiently to relax a thermal stress generated in the honeycomb structure, and can largely inhibit the cracking of the resultant honeycomb structure.

DESCRIPTION OF REFERENCE NUMERALS

Figure 1:
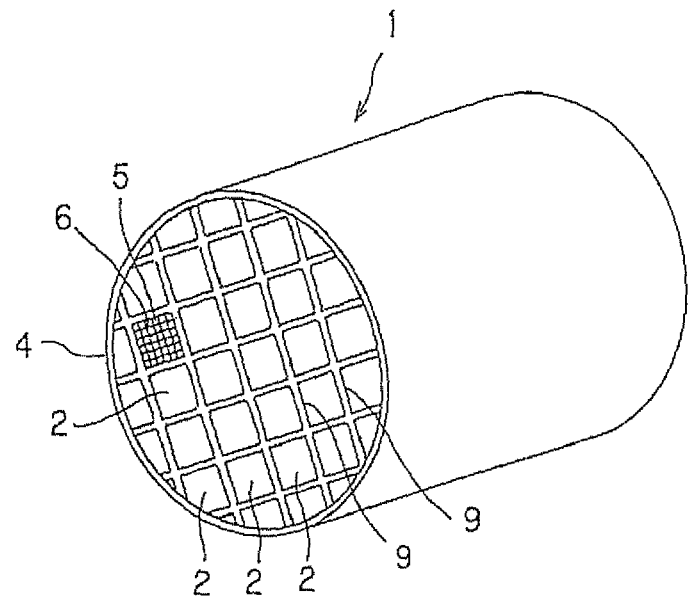
FIG. 1 is a perspective view schematically showing one embodiment (the whole sectional shape cut along a plane vertical to the central axis is a circular shape) of a honeycomb structure according to the present invention.

1: honeycomb structure, 2: honeycomb segment, 4: coating material, 5: cell, 6: partition wall, 7: filling material, 9: bonding material layer

BEST MODE FOR CARRYING OUT THE INVENTION

A bonded element of the present invention will hereinafter be described in detail based on a specific embodiment, but the present invention is not limited to this embodiment when interpreted, and the present invention can variously be changed, modified or improved based on the knowledge of any person skilled in the art without departing from the scope of the present invention.

The bonded element according to the present invention is a bonded element in which two or more objects to be bonded (hereinafter referred to as the objects to be bonded) are integrated via a bonding material layer, the bonding material layer having a Young's modulus of 20% or less of that of the objects to be bonded and having an average linear thermal expansion coefficient of 70% or less of that of the objects to be bonded, the bonding material layer being prepared from a bonding material composition composed mainly of fillers and a matrix in which fillers having an average linear thermal expansion coefficient of $2.0 \times 10^{-6} \cdot K^{-1}$ or less are contained. It is to be noted that in the bonded element according to the present invention, the bonding material layers preferably have an average linear thermal expansion coefficient of $2.5 \times 10^{-6} \cdot K^{-1}$ or less (more preferably 0 to $2.0 \times 10^{-6} \cdot K^{-1}$). This is because a thermal stress generated in a honeycomb structure can be decreased, as the thermal expansion coefficient of the bonding material layers decreases.

Here, the bonding material layers of the present invention preferably have a Young's modulus of 20% or less (more preferably, 2 to 18%) of that of the objects to be bonded. This is because when the Young's modulus exceeds 20% of that of the objects to be bonded, the thermal stress generated in the bonding material layer between the honeycomb segments during actual use increases, and the honeycomb structure as the assembly of the honeycomb segments is cracked. On the other hand, when the Young's modulus is less than 2% of that of the objects to be bonded, a bonded state between the honeycomb segments is insufficient, and subsequently it becomes difficult to prepare the honeycomb structure.

Moreover, the bonding material layers of the present invention preferably have an average linear thermal expansion coefficient of 70% or less (more preferably, 0 to 65%) of that of the objects to be bonded. This is because when the average linear thermal expansion coefficient exceeds 70% of that of the objects to be bonded, the thermal stress generated in the honeycomb structure during the actual use increases, and the honeycomb structure as the assembly of the honeycomb segments is cracked.

Furthermore, the bonding material layers of the present invention have porosities in a range of 25 to 85%, more preferably 30 to 80%. This is because when the porosities are less than 25%, it is difficult to lower the Young's modulus of the bonding material layers. When the porosities exceed 85%, the strength of the bonding material layers lowers, and the layers easily break.

It is to be noted that the bonding material composition for preparing the bonding material layers in the present invention is composed mainly of the fillers and the matrix, and contains an additive such as an organic binder or water as a subcomponent. The volume fraction of the fillers occupied in the bonding material composition is preferably 20 to 80% (more preferably, 25 to 75%).

Here, in the bonding material composition of the present invention, the ratio of the fillers having the average linear thermal expansion coefficient of $2.0 \times 10^{-6} \cdot K^{-1}$ or less occupied in all the fillers is preferably 10 to 100% (more preferably, 20 to 100%). Moreover, the fillers having an average linear thermal expansion coefficient of $2.0 \times 10^{-6} \cdot K^{-1}$ or less are preferably of at least one type selected from the group consisting of cordierite, amorphous silica, aluminum titanate and zirconium phosphate. This is because the characteristics of the material (the fillers and the matrix) constituting the bonding material composition are reflected in those of the bonding material layers. Therefore, in a case where the average linear thermal expansion coefficient of the bonding material layers is set to $2.5 \times 10^{-6} \cdot K^{-1}$ or less which is sufficient for relaxing the generated thermal stress, the average linear thermal expansion coefficient of the fillers needs to be set to a lower value, that is, $2.0 \times 10^{-6} \cdot K^{-1}$ or less.

It is to be noted that other fillers for use in the present invention are preferably of at least one type selected from the group consisting of silicon carbide, alumina, quartz, aluminum nitride, $B_4C$, mullite, SiAlON, silicon nitride, zirconia, alumino silicate fibers, alumina fibers, magnesium silicate fibers, calcium magnesium silicate fibers, boron nitride, talc, mica and glass flakes. In the present invention, it is preferable to contain, as the fillers, at least one type of inorganic fibers or plate-like fillers selected from the group consisting of alumino silicate fibers, alumina fibers, magnesium silicate fibers, boron nitride, talc, mica and glass flakes among the above-mentioned fillers. When the inorganic fibers or plate-like particles are used as the fillers, the strength of the bonding material layers can be improved. Moreover, it is further preferable to contain, as the fillers, the plate-like particles of at least one type selected from the group consisting of boron nitride, talc, mica and the glass flakes among the above-mentioned fillers. When the plate-like particle fillers are used as the fillers instead of the inorganic fibers, a tensile Young's modulus lowers, and the thermal stress can be relaxed. Moreover, when the plate-like particle fillers having a high aspect ratio are used instead of the inorganic fibers, the directivity of contraction during drying or a thermal treatment is eliminated, the contraction entirely occurs evenly, and the generation of defects such as cracks and voids can be decreased. Therefore, while maintaining characteristics in a case where the inorganic fibers are used as the fillers, a bonded element which does not have any problem in viewpoint of cost and health can be obtained.

Moreover, the matrix for use in the present invention is preferably an inorganic adhesive, because filler particles, and the objects to be bonded and the fillers need to appropriately be bonded to one another. Examples of the matrix include colloidal silica, colloidal alumina, ethyl silicate, water glass, silica polymer, aluminum phosphate and bentonite. In particular, colloidal silica is more preferable. This matrix has excellent bonding force, good compatibility with the fillers, chemical stability, thermal resistance and the like.

It is to be noted that as to the bonding material composition of the present invention, the fillers are mixed. An organic binder (e.g., methyl cellulose (MC), carboxymethyl cellulose (CMC) or the like), a resin balloon, a smectite-based clay and a dispersant may be added in case of need. Furthermore, as the matrix, the inorganic adhesive (e.g., colloidal silica or the like) is mixed, or water is mixed, if necessary. The resultant mixture can be kneaded with a mixer for a predetermined time to prepare the composition.

The amount of the resin balloon to be added is preferably 0.1 to 5 mass %, more preferably 0.2 to 3.5 mass %, further preferably 0.3 to 2.0 mass %. When the amount is less than 0.1 mass %, a sufficient porosity cannot be obtained, and the Young's modulus sometimes increases. When the amount exceeds 5 mass %, the porosity becomes excessively large, and a sufficient bonding strength is sometimes not obtained.

The amount of the smectite-based clay to be added is preferably 0.1 to 5 mass %, more preferably 0.2 to 3.5 mass %, further preferably 0.3 to 2.0 mass %. When the amount is less than 0.1 mass %, pores having sufficient sizes cannot be formed, and the Young's modulus sometimes increases. When the amount exceeds 5 mass %, the pores become excessively large, and the sufficient bonding strength is sometimes not obtained.

The amount of the water to be mixed is preferably 16 to 40 mass %, more preferably 18 to 38 mass %, further preferably 20 to 36 mass %. When the amount is less than 16 mass %, the sufficient porosity cannot be obtained, and the Young's modulus sometimes increases. When the amount exceeds 40 mass %, the porosity becomes excessively large, and hence the sufficient bonding strength is sometimes not obtained.

Moreover, when the objects to be bonded are bonded to each other by use of the bonding material composition of the present invention, the bonding temperature of the composition to the objects to be bonded is preferably 1000° C. or less (more preferably 50° C. or more and 900° C. or less, further preferably 100° C. or more and 800° C. or less) from a viewpoint that a sufficient strength or bonded state can be developed. Even when the temperature exceeds 1000° C., the objects to be bonded can be bonded without any problem. However, it is not favorable since the desired characteristics (the Young's modulus, the thermal expansion coefficient, etc.) are hardly attained.

Next, one example of a structure for the honeycomb structure to which the bonding material composition (the bonding material) of the present invention is applied will specifically be described.

Figure 2:
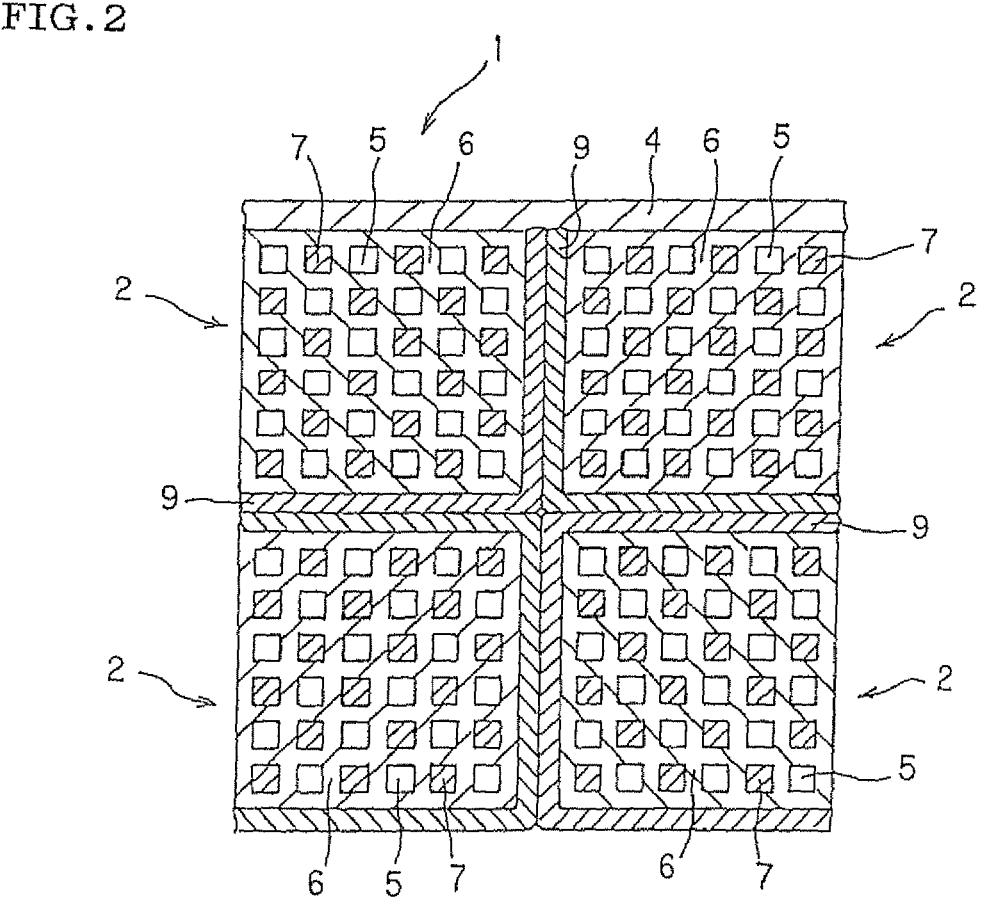
FIG. 2 is a front view showing a part of another embodiment (the whole sectional shape cut along the plane vertical to the central axis is a square shape) of the honeycomb structure according to the present invention as viewed from an end face side.

In a honeycomb structure 1 of the present invention, as shown in FIGS. 1 and 2, each of a plurality of honeycomb segments 2 has a structure in which a plurality of cells 5 divided by porous partition walls 6 and forming fluid flow paths are arranged in parallel with one another in the central axis direction of the honeycomb structure 1. Each of the honeycomb segments has a shape constituting a part of the whole structure, and has such a shape as to constitute the whole structure, when the honeycomb segments are assembled in a direction vertical to the central axis of the honeycomb structure 1. The honeycomb segments are integrally bonded via bonding material layers 9 formed of the bonding material composition (the bonding material) of the present invention, to constitute the honeycomb structure as a honeycomb segment bonded element.

Here, after bonding the honeycomb segments 2 together via the bonding material layers 9, the bonded element is ground so that the whole sectional shape cut along a plane vertical to the central axis of the honeycomb structure 1 is a shape such as a circular shape, an elliptic shape, a triangular shape or a square shape, and the outer peripheral surface of the bonded element is coated with a coating material 4. When this honeycomb structure 1 is used as a DPF, the honeycomb structure can be arranged in an exhaust system of a diesel engine or the like to trap a particulate matter (particulates) including soot discharged from the diesel engine.

Figure 3:
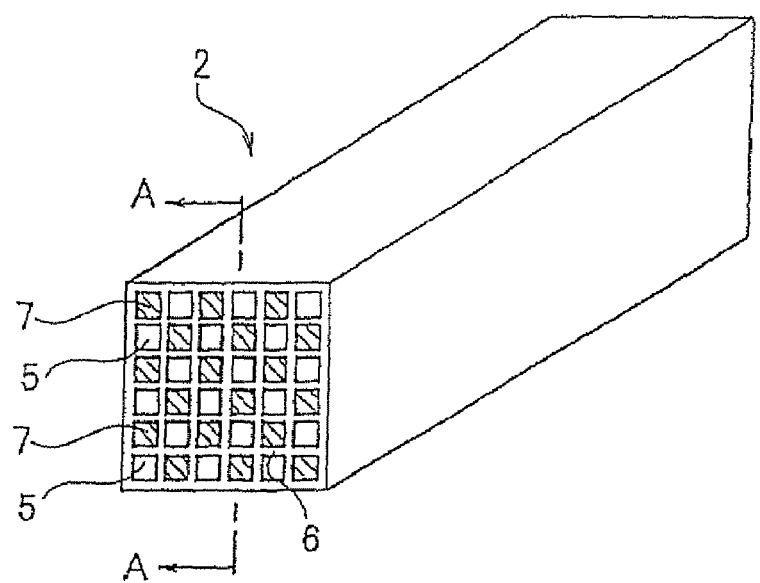
FIG. 3 is a perspective view schematically showing a honeycomb segment for use in still another embodiment of the honeycomb structure according to the present invention.
Figure 4:
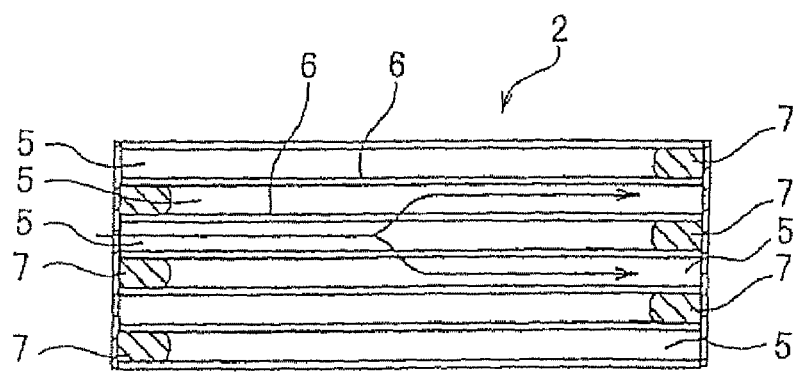
FIG. 4 is a sectional view cut along the A-A line of FIG. 3.

Moreover, FIG. 1 shows the cells 5 and the partition walls 6 only in one honeycomb segment 2. As shown in FIGS. 3, 4, each of the honeycomb segments 2 has a shape constituting a part of the whole structure of the honeycomb structure 1 (the honeycomb segment bonded element) (see FIG. 1), and has such a shape as to constitute the whole structure, when assembled in a direction vertical to the central axis of the honeycomb structure 1 (see FIG. 1). The cells 5 are arranged in parallel with one another in the central axis direction of the honeycomb structure 1, and the ends of the adjacent cells 5 are alternately plugged with filling materials 7.

The predetermined cells 5 (inflow cells) open on a left end side in FIGS. 3, 4, and are plugged with the filling materials 7 on a right end side. The other cells 5 (outflow cells) are plugged with the filling materials 7 on the left end side, and open on the right end side. The cells are plugged in this manner, whereby as shown in FIG. 2, the end face of each honeycomb segment 2 has a checkered pattern. In a case where the honeycomb structure 1 in which the plurality of honeycomb segments 2 are bonded in this manner is arranged in the exhaust system of the exhaust gas, the exhaust gas flows into the cells 5 of the honeycomb segments 2 from the left side in FIG. 4, to move to the right side.

FIG. 4 shows a case where the left side of the honeycomb segment 2 is the inlet of the exhaust gas. The exhaust gas flows into the honeycomb segment 2 from the cells 5 (the inflow cells) which open without being plugged. The exhaust gas which has flowed into the cells 5 (the inflow cells) passes through the porous partition walls 6, and is discharged from the other cells 5 (the outflow cells). Then, when the exhaust gas passes through the partition walls 6, a particulate matter (particulates) including soot in the exhaust gas is trapped by the partition walls 6. Thus, the exhaust gas can be purified. Owing to such trapping, the particulate matter (the particulates) including the soot is deposited in the honeycomb segment 2 with an elapse of time, to increase a pressure loss. Therefore, the soot and the like are burnt to perform regeneration. It is to be noted that FIGS. 2 to 4 show the honeycomb segment 2 in which the whole sectional shape is square, but the segment may have another shape such as a triangular shape or a hexagonal shape. Moreover, the sectional shape of each of the cells 5 may be another shape such as a triangular shape, a hexagonal shape, a circular shape or an elliptic shape.

As shown in FIG. 2, the bonding material layers 9 are formed of the bonding material composition of the present invention, the outer peripheral surfaces of the honeycomb segments 2 are coated with the layers, and the layers function so as to bond the honeycomb segments 2 together. The outer peripheral surfaces of the adjacent honeycomb segments 2 may be coated with the bonding material layers 9, but only one of the outer peripheral surfaces of the adjacent honeycomb segments 2 facing each other may be coated. Such coating of the only one of the facing surfaces is preferable in that the amount of the bonding material layers 9 for use can be saved. The thicknesses of the bonding material layers 9 are determined in consideration of a bonding force between the honeycomb segments 2, and are appropriately selected from a range of, for example, 0.5 to 3.0 mm.

Examples of the material of the honeycomb segment 2 for use in the present embodiment include a material constituted of at least one type selected from the group consisting of silicon carbide (SiC), a silicon-silicon carbide based composite material formed using silicon carbide (SiC) as an aggregate and silicon (Si) as a binding material, silicon nitride, cordierite, mullite, alumina, spinel, a silicon carbide-cordierite based composite material, a silicon-silicon carbide based composite material, lithium aluminum silicate, aluminum titanate and an Fe—Cr—Al based metal. Above all, the material is preferably constituted of silicon carbide (SiC) or the silicon-silicon carbide based composite material.

To prepare the honeycomb segment 2, for example, a binder such as methyl cellulose, hydroxypropoxyl cellulose, hydroxyethyl cellulose, carboxymethyl cellulose or polyvinyl alcohol, a surfactant, water as a solvent and the like are added to the appropriate material selected from the above-mentioned materials, to form a kneaded clay having plasticity, and this clay is extruded to form the above-mentioned shape. Subsequently, the material is dried with microwave, hot air or the like, and then fired.

As the filling material 7 for use in plugging the cells 5, a material similar to that of the honeycomb segment 2 can be used. To plug the cells with the filling material 7, in a state where the cells 5 which are not to be plugged are masked, the end face of the honeycomb segment 2 is immersed in the slurried filling material 7 to fill the opened cells 5. The opened cells may be filled with the filling material 7 before or after firing the formed honeycomb segment 2. However, it is preferable to perform the filling before the firing, because only one firing step can be performed.

After preparing the honeycomb segment 2 as described above, the outer peripheral surface of the honeycomb segment 2 is coated with a paste-like bonding material composition to form the bonding material layer 9. A plurality of honeycomb segments 2 are assembled so as to form a predetermined three-dimensional shape (the whole structure of the honeycomb structure 1), and the assembled honeycomb segments are pressed, then heated and dried. Thus, a bonded element in which a plurality of honeycomb segments 2 is integrally bonded is prepared. Afterward, this bonded element is ground into the above-mentioned shape, and the outer peripheral surface of the bonded element is coated with the coating material 4, heated and dried. Thus, the honeycomb structure 1 shown in FIG. 1 is prepared. As the material of the coating material 4, a material similar to the bonding material layer 9 may be used. The thickness of the coating material 4 is appropriately selected from a range of, for example, 0.1 to 1.5 mm.

EXAMPLES

The present invention will hereinafter be described more specifically in accordance with examples, but the present invention is not limited to these examples.

Examples 1 to 22, Comparative Examples 1 to 5

Preparation of Honeycomb Segment

As a honeycomb segment material, SiC powder and metal Si powder were mixed at a mass ratio of 80:20, and a pore former, an organic binder, a surfactant and water were added to this resultant mixture, to prepare a kneaded clay having plasticity. This clay was extruded and dried to obtain a formed honeycomb segment body having a partition wall thickness of 310 μm, a cell density of about 46.5 cells/cm$^2$ (300 cells/square inch), a square sectional shape with each 35 mm side and a length of 152 mm. Both end faces of cells were plugged so that the end faces of this formed honeycomb segment body had a checkered pattern. That is, the cells were plugged alternately so as to close the opposite ends of the cells adjacent to each other. As a plugging material, a material similar to that of the honeycomb segment material was used. Both the cell end faces were plugged in this manner, drying was performed, and then degreasing was performed at about 400° C. in the atmosphere. Afterward, the formed body was fired at about 1450° C. in an inert Ar atmosphere to obtain a honeycomb segment having a porous structure in which SiC crystal particles were bound with Si.

(Preparation of Bonding Material Composition)

A dispersant, a resin balloon, a smectite-based clay and an organic binder (CMC and MC) were added to a mixture of filler types (Filler A and/or Filler B) shown in Tables 1 and 2, and the mixture was further mixed with colloidal silica as a matrix and kneaded with a mixer for 30 minutes, to obtain types of paste-like bonding material compositions (bonding materials No. 1 to 27) having different composition ratios as shown in Tables 1 and 2. It is to be noted that the ratio of all the fillers in the bonding material composition at this time is the total of Filler A and Filler B in a column "filler volume fraction in bonding material composition" in Tables 1 and 2. For example, in the case of bonding material No. 1, the volume fraction is 50%, and the ratio of the matrix in the bonding material composition is obtained by dividing, by 100, the total of Filler A and Filler B in the column "filler volume fraction in bonding material composition" in Table 1. For example, in the case of the bonding material No. 1, the ratio is 50%. Moreover, as shown in "other" columns of Tables 1 and 2, the dispersant, the resin balloon and the organic binder were added as a super addition to the total of all the fillers and the matrix.

TABLE 1

| Bonding material No. | Filler type | Matrix type | Young's modulus of filler/GPa | Average linear thermal expansion coefficient of fillers/×10−6K−1 | Filler linear thermal expansion coefficient/object to be bonded linear thermal expansion coefficient (%) |
|---|---|---|---|---|---|
| 1 | A: SiC<br>B: Cordierite | Colloidal silica | A: 400<br>B: 100 | A: 4.5<br>B: 1.2 | A: 110<br>B: 30 |
| 2 | A: SiC<br>B: Cordierite | Colloidal silica | A: 400<br>B: 100 | A: 4.5<br>B: 1.2 | A: 110<br>B: 30 |
| 3 | A: SiC<br>B: Cordierite | Colloidal silica | A: 400<br>B: 100 | A: 4.5<br>B: 1.2 | A: 110<br>B: 30 |
| 4 | A: SiC<br>B: Amorphous silica | Colloidal silica | A: 400<br>B: 60 | A: 4.5<br>B: 1.1 | A: 110<br>B: 28 |
| 5 | A: SiC<br>B: Aluminum titanate | Colloidal silica | A: 400<br>B: 120 | A: 4.5<br>B: 2.0 | A: 110<br>B: 50 |
| 6 | A: SiC<br>B: Zirconium phosphate | Colloidal silica | A: 400<br>B: 130 | A: 4.5<br>B: 1.8 | A: 110<br>B: 45 |
| 7 | A: SiC<br>B: Aluminosilicate fiber | Colloidal silica | A: 400<br>B: 90 | A: 4.5<br>B: 1.8 | A: 110<br>B: 45 |
| 8 | A: Aluminosilicate fiber | Colloidal silica | A: 90 | A: 1.8 | A: 45 |
| 9 | A: Boron nitride<br>B: Cordierite | Colloidal silica | A: 40<br>B: 100 | A: 3.0<br>B: 1.2 | A: 75<br>B: 30 |
| 10 | A: Talc<br>B: Cordierite | Colloidal silica | A: 170<br>B: 100 | A: 7.8<br>B: 1.2 | A: 190<br>B: 30 |
| 11 | A: Mica<br>B: Cordierite | Colloidal silica | A: 180<br>B: 100 | A: 9.3<br>B: 1.2 | A: 230<br>B: 30 |
| 12 | A: Glass flake<br>B: Cordierite | Colloidal silica | A: 70<br>B: 100 | A: 5.1<br>B: 1.2 | A: 120<br>B: 30 |
| 13 | A: SiC<br>B: Cordierite | Colloidal silica | A: 400<br>B: 100 | A: 4.5<br>B: 1.2 | A: 110<br>B: 30 |
| 14 | A: SiC<br>B: Cordierite | Colloidal silica | A: 400<br>B: 100 | A: 4.5<br>B: 1.2 | A: 110<br>B: 30 |

| Bonding material No. | Volume fraction of fillers in bonding material composition (%) | Organic binder (super addition) mass % | Resin balloon (super addition) mass % | Smectite-based clay (super addition) mass % | Dispersant (super addition) mass % | Water content in bonding material composition (mass %) |
|---|---|---|---|---|---|---|
| 1 | A: 25<br>B: 30 | 0.2 | 1.5 | 0 | 0.1 | 21 |
| 2 | A: 30<br>B: 30 | 0.2 | 1.5 | 0 | 0.1 | 20 |
| 3 | A: 25<br>B: 25 | 0.2 | 1.5 | 0 | 0.1 | 22 |
| 4 | A: 25<br>B: 30 | 0.2 | 1.5 | 0 | 0.1 | 21 |
| 5 | A: 25<br>B: 30 | 0.2 | 1.5 | 0 | 0.1 | 22 |
| 6 | A: 25<br>B: 30 | 0.2 | 1.5 | 0 | 0.1 | 21 |
| 7 | A: 25<br>B: 30 | 0.2 | 1.5 | 0 | 0.1 | 20 |
| 8 | A: 55 | 0.2 | 1.5 | 0 | 0.1 | 16 |
| 9 | A: 15<br>B: 40 | 0.2 | 1.5 | 0 | 0.1 | 24 |
| 10 | A: 15<br>B: 40 | 0.2 | 1.5 | 0 | 0.1 | 22 |
| 11 | A: 15<br>B: 40 | 0.2 | 1.5 | 0 | 0.1 | 23 |
| 12 | A: 15<br>B: 40 | 0.2 | 1.5 | 0 | 0.1 | 22 |

TABLE 1-continued

| | | | | | | |
|---|---|---|---|---|---|---|
| 13 | A: 25<br>B: 30 | 0.2 | 0.1 | 0 | 0.1 | 20 |
| 14 | A: 25<br>B: 30 | 0.2 | 3 | 0 | 0.1 | 21 |

TABLE 2

| Bonding material No. | Filler type | Matrix type | Young's modulus of filler/GPa | Average linear thermal expansion coefficient of fillers/×10−6K−1 | Filler linear thermal expansion coefficient/object to be bonded linear thermal expansion coefficient (%) | Volume fraction of fillers in bonding material composition (%) |
|---|---|---|---|---|---|---|
| 15 | A: SiC<br>B: Cordierite | Colloidal silica | A: 400<br>B: 100 | A: 4.5<br>B: 1.2 | A: 110<br>B: 30 | A: 25<br>B: 30 |
| 16 | A: SiC<br>B: Cordierite | Colloidal silica | A: 400<br>B: 100 | A: 4.5<br>B: 1.2 | A: 110<br>B: 30 | A: 30<br>B: 30 |
| 17 | A: SiC<br>B: Cordierite | Colloidal silica | A: 400<br>B: 100 | A: 4.5<br>B: 1.2 | A: 110<br>B: 30 | A: 25<br>B: 30 |
| 18 | A: SiC<br>B: Cordierite | Colloidal silica | A: 400<br>B: 100 | A: 4.5<br>B: 1.2 | A: 110<br>B: 30 | A: 25<br>B: 30 |
| 19 | A: SiC<br>B: Cordierite | Colloidal silica | A: 400<br>B: 100 | A: 4.5<br>B: 1.2 | A: 110<br>B: 30 | A: 25<br>B: 30 |
| 20 | A: SiC<br>B: Cordierite | Colloidal silica | A: 400<br>B: 100 | A: 4.5<br>B: 1.2 | A: 110<br>B: 30 | A: 25<br>B: 30 |
| 21 | A: SiC<br>B: Cordierite | Colloidal silica | A: 400<br>B: 100 | A: 4.5<br>B: 1.2 | A: 110<br>B: 30 | A: 25<br>B: 30 |
| 22 | A: SiC<br>B: Cordierite | Colloidal silica | A: 400<br>B: 100 | A: 4.5<br>B: 1.2 | A: 110<br>B: 30 | A: 25<br>B: 30 |
| 23 | A: SiC<br>B: Cordierite | Colloidal silica | A: 400<br>B: 100 | A: 4.5<br>B: 1.2 | A: 110<br>B: 30 | A: 35<br>B: 25 |
| 24 | A: SiC<br>B: Cordierite | Colloidal silica | A: 400<br>B: 100 | A: 4.5<br>B: 1.2 | A: 110<br>B: 30 | A: 25<br>B: 25 |
| 25 | A: SiC | Colloidal silica | A: 400 | A: 4.5 | A: 110 | A: 55 |
| 26 | A: SiC<br>B: Cordierite | Colloidal silica | A: 400<br>B: 100 | A: 4.5<br>B: 1.2 | A: 110<br>B: 30 | A: 20<br>B: 20 |
| 27 | A: SiC<br>B: Cordierite | Colloidal silica | A: 400<br>B: 100 | A: 4.5<br>B: 1.2 | A: 110<br>B: 30 | A: 5<br>B: 10 |

| Bonding material No. | Organic binder (super addition) mass % | Resin balloon (super addition) mass % | Smectite-based clay (super addition) mass % | Dispersant (super addition) mass % | Water content in bonding material composition (mass %) |
|---|---|---|---|---|---|
| 15 | 0.2 | 5 | 0 | 0.1 | 22 |
| 16 | 0.2 | 2 | 0 | 0.1 | 18 |
| 17 | 0.2 | 1.5 | 0.1 | 0.1 | 23 |
| 18 | 0.2 | 1.5 | 0.5 | 0.1 | 25 |
| 19 | 0.2 | 1.5 | 3 | 0.1 | 28 |
| 20 | 0.3 | 1.5 | 0 | 0.1 | 25 |
| 21 | 0.4 | 1.5 | 0 | 0.1 | 30 |
| 22 | 0.5 | 1.5 | 0 | 0.1 | 38 |
| 23 | 0.2 | 1.5 | 0 | 0.1 | 20 |
| 24 | 0.2 | 0 | 0 | 0.1 | 21 |
| 25 | 0.2 | 0 | 0 | 0.1 | 21 |
| 26 | 0.2 | 0 | 0 | 0.1 | 20 |
| 27 | 0.2 | 1.5 | 0 | 0.1 | 21 |

(Preparation of Honeycomb Structure)

A step of coating the outer wall surface of the honeycomb segment with the bonding material having a thickness of about 1 mm to form a bonding material layer, and mounting another honeycomb segment on the layer was repeated to prepare a laminated honeycomb segment body constituted of sixteen 4×4 combined honeycomb segments. A pressure or the like was appropriately applied from the outside to bond the whole body together. Afterward, the body was dried at 140° C. for two hours to obtain a honeycomb segment bonded element for each of the bonding materials (No. 1 to 27). The outer peripheries of the resultant honeycomb segment bonded elements were cut into cylindrical shapes, and the outer peripheral surfaces of the bodies were coated with a coating material. The bodies were dried and cured at 700° C. for two hours to obtain honeycomb structures, respectively.

(Evaluation of Bonding Material Layer)

As to the Young's modulus, average linear thermal expansion coefficient and porosity of each of the bonding material layers of the resultant honeycomb structures, the bonding material layers of the honeycomb structure were cut to obtain a sample having a predetermined shape. The Young's modulus of the sample was obtained from a load-displacement curve in a three-point bending test conforming to JIS R 1601, the average linear thermal expansion coefficient was measured in conformity to JIS R 1618, and the porosity was measured by Archimedes process. The results are shown in Tables 3 and 4.

(Evaluation of Bonded Honeycomb Body)

The resultant honeycomb structures were checked for bonded states, and subjected to a rapid heating test (burner spalling test B-sp), a rapid cooling test (electric furnace spalling test E-sp) and an engine test (E/G test), respectively. The results are shown in Tables 3 and 4.

(1) Bonded state

The states of bonded portions after the bonding and curing were visually observed, and bonding strength was manually observed. It is to be noted that in the states shown in Tables 3 and 4, in the case of ⊚, a firmly bonded state without any crack or defect is indicated. In the case of ○, unlike the case of ⊚, a bonded state including a slight amount of cracks or defects is indicated. In the case of X, a bonded state to such a degree that the bonded portion is easily peeled or removed, or a state including a large amount of cracks or defects is indicated.

(2) "B-sp" test [burner spalling test (rapid heating test)]

Air heated with a burner was supplied to each of the honeycomb structures to make a temperature difference between the center of the structure and an outer portion thereof, and a thermal shock resistance was evaluated at such a temperature that any crack was not generated in the honeycomb structure in the test (as the temperature rose, the thermal shock resistance was high). It is to be noted that in Tables 3 and 4, numerals indicate the upper limits of the temperature at which any crack is not generated.

(3) "E-sp" test [electric furnace spalling test (rapid cooling test)]]

Each of the honeycomb structures was heated at 550° C.×2 hr. in an electric furnace to obtain a uniform temperature (450° C.). Afterward, the structure was taken at room temperature, and the thermal shock resistance was evaluated by judging whether or not the honeycomb structure was cracked in the test. It is to be noted that in Tables 3 and 4, in the case of ○, it is indicated that any crack is not generated. In the case of X, it is indicated that the crack is generated.

(4) "E/G" test [engine test 1000° C.]

Deposited particulates were burned for filter regeneration. On conditions that the temperature of the honeycomb center was 1000° C., the thermal shock resistance was evaluated by judging whether or not the honeycomb structure was cracked in the test. It is to be noted that in Tables 3 and 4, in the case of ○, it is indicated that ○ any crack is not generated. In the case of X, it is indicated that the crack is generated.

TABLE 3

| | Bonding material No. | Bonding material layer Young's modulus/object to be bonded Young's modulus (%) | Bonding material layer linear thermal expansion coefficient/object to be bonded linear thermal expansion coefficient (%) | Bonding material layer thermal expansion coefficient/×10−6K−1 | Bonding material layer porosity/% | Bonded state | B-sp test (° C.) | E-sp test | E/G test |
|---|---|---|---|---|---|---|---|---|---|
| Example 1 | 1 | 11 | 47 | 2.1 | 59 | ⊚ | 1000 | ○ | ○ |
| Example 2 | 2 | 11 | 51 | 2.3 | 60 | ⊚ | 950 | ○ | ○ |
| Example 3 | 3 | 16 | 44 | 2 | 55 | ⊚ | 850 | ○ | ○ |
| Example 4 | 4 | 13 | 47 | 2.1 | 57 | ⊚ | 900 | ○ | ○ |
| Example 5 | 5 | 12 | 56 | 2.5 | 58 | ⊚ | 850 | ○ | ○ |
| Example 6 | 6 | 13 | 53 | 2.4 | 58 | ⊚ | 850 | ○ | ○ |
| Example 7 | 7 | 15 | 56 | 2.5 | 53 | ⊚ | 850 | ○ | ○ |
| Example 8 | 8 | 18 | 44 | 2 | 49 | ⊚ | 800 | ○ | ○ |
| Example 9 | 9 | 7 | 40 | 1.8 | 60 | ⊚ | 1000 | ○ | ○ |
| Example 10 | 10 | 6 | 53 | 2.4 | 60 | ⊚ | 1000 | ○ | ○ |
| Example 11 | 11 | 5 | 56 | 2.5 | 61 | ⊚ | 1000 | ⊚ | ⊚ |
| Example 12 | 12 | 6 | 51 | 2.3 | 60 | ⊚ | 1000 | ○ | ○ |
| Example 13 | 13 | 13 | 47 | 2.1 | 57 | ⊚ | 1000 | ○ | ○ |
| Example 14 | 14 | 8 | 47 | 2.1 | 61 | ⊚ | 1000 | ○ | ○ |

TABLE 4

| | Bonding material No. | Bonding material layer Young's modulus/object to be bonded Young's modulus (%) | Bonding material layer linear thermal expansion coefficient/object to be bonded linear thermal expansion coefficient (%) | Bonding material layer thermal expansion coefficient/×10−6K−1 | Bonding material layer porosity/% | Bonded state | B-sp test (° C.) | E-sp test | E/G test |
|---|---|---|---|---|---|---|---|---|---|
| Example 15 | 15 | 7 | 47 | 2.1 | 64 | ○ | 1000 | Δ | ○ |
| Example 16 | 16 | 1 | 44 | 2 | 86 | ○ | 750 | ○ | ○ |
| Example 17 | 17 | 9 | 47 | 2.1 | 62 | ○ | 1000 | ○ | ○ |
| Example 18 | 18 | 7 | 47 | 2.1 | 63 | ○ | 1000 | ○ | ○ |
| Example 19 | 19 | 5 | 49 | 2.2 | 65 | ○ | 1000 | Δ | ○ |
| Example 20 | 20 | 7 | 47 | 2.1 | 63 | ○ | 1000 | Δ | ○ |
| Example 21 | 21 | 6 | 47 | 2.1 | 65 | ○ | 1000 | Δ | ○ |
| Example 22 | 22 | 4 | 44 | 2 | 68 | ○ | 1000 | Δ | ○ |
| Comparative Example 1 | 23 | 14 | 78 | 3.5 | 58 | ○ | 750 | x | x |
| Comparative Example 2 | 24 | 34 | 44 | 2 | 45 | ○ | 700 | x | x |
| Comparative Example 3 | 25 | 38 | 93 | 4.2 | 42 | ○ | 600 | x | x |
| Comparative Example 4 | 26 | 83 | 42 | 1.9 | 23 | ○ | 600 | x | x |
| Comparative Example 5 | 27 | 63 | 31 | 1.4 | 35 | x | Impossbile to test | Impossbile to test | Impossbiie to test |

Consideration

Examples 1 to 22, Comparative Examples 1 to 5

From the results shown in Tables 3 and 4, in Examples 1 to 22, the Young's modulus of the bonding material layer was 20% or less of that of the object to be bonded, and the average linear thermal expansion coefficient was 70% or less of that of the object to be bonded. Therefore, after each of the tests, any fault such as the crack or the defect was not seen in each of the honeycomb structures, and satisfactory results could be obtained.

On the other hand, in Comparative Example 1, the average linear thermal expansion coefficient of the bonding material layer was larger than 70% of that of the object to be bonded. Therefore, after each of the tests, the crack was generated. In Comparative Example 2, the Young's modulus of the bonding material layer was larger than 20% of that of the object to be bonded. Therefore, after each of the tests, the crack was generated. In Comparative Example 3, the average linear thermal expansion coefficient of the bonding material layer was larger than 70% of that of the object to be bonded, and the Young's modulus of the bonding material layer was larger than 20% of that of the object to be bonded. Therefore, after each of the tests, on looser conditions, the crack was generated. In Comparative Example 4, the bonding material layer had a porosity which was less than 25%, and hence on loose conditions, the crack was generated.

Moreover, in Comparative Example 5 (the volume fraction of the fillers in the bonding material layer was smaller than 20%), a bonded state between honeycomb segments was poor, and a honeycomb structure (a sample) for use in the subsequent test could not be prepared.

INDUSTRIAL APPLICABILITY

A bonded element using a bonding material composition according to the present invention and a honeycomb structure constituted of the bonded element can preferably be used in preparing a trap filter for an exhaust gas, above all, a diesel particulate filter (DPF) which traps a particulate matter (particulates) or the like in the exhaust gas from a diesel engine.

The invention claimed is:

1. A bonded element comprising:
   a first object;
   a bonding material layer; and
   a second object that is bonded to the first object via the bonding material layer, the bonding material layer having a Young's modulus of 20% or less of that of the first and second objects and having an average linear thermal expansion coefficient of 70% or less of that of the first and second objects, the bonding material layer being prepared from a bonding material composition composed of fillers and a matrix, the fillers having an average linear thermal expansion coefficient of $2.0 \times 10^{-6} \cdot K^{-1}$ or less.

2. The bonded element according to claim 1, wherein the bonding material layer has an average linear thermal expansion coefficient of $2.5 \times 10^{-6} \cdot K^{-1}$ or less.

3. The bonded element according to claim 1, wherein the bonding material layer has porosities in a range of 25 to 85%.

4. The bonded element according to claim 1, wherein the fillers having the average linear thermal expansion coefficient of $2.0 \times 10^{-6} \cdot K^{-1}$ or less are of at least one type selected from the group consisting of cordierite, amorphous silica, aluminum titanate and zirconium phosphate.

5. The bonded element according to claim 1, which contains inorganic fibers as the fillers.

6. The bonded element according to claim 5, wherein the inorganic fibers are of at least one type selected from the group consisting of aluminosilicate fibers, alumina fibers, magnesium silicate fibers and calcium magnesium silicate fibers.

7. The bonded element according to claim 1, which contains plate-like particles as the fillers.

8. The bonded element according to claim 7, wherein the plate-like particles are of at least one type selected from the group consisting of boron nitride, talc, mica and glass flakes.

9. The bonded element according to claim 1, wherein the volume fraction of the fillers occupied in the bonding material composition is in a range of 20 to 80%.

10. The bonded element according to claim 1, wherein the matrix is an inorganic adhesive.

11. The bonded element according to claim 10, wherein the inorganic adhesive is colloidal silica.

12. The bonded element according to claim 1, which contains, as a sub-component of the bonding material composition, at least one selected from the group consisting of an organic binder, a resin balloon, a smectite-based clay, a dispersant and water.

13. The bonded element according to claim 12, which contains 0.1 to 5 mass % of resin balloon as the sub-component of the bonding material composition.

14. The bonded element according to claim 12, which contains 0.1 to 5 mass % of smectite-based clay as the sub-component of the bonding material composition.

15. The bonded element according to claim 1, wherein the bonding material composition contains 16 to 40 mass % of water content.

16. A honeycomb segment bonded element which is prepared by bonding a plurality of honeycomb segments together by use of a composition for use in the bonding material layer of the bonding material according to claim 1.

17. A honeycomb structure which is prepared using the honeycomb segment bonded element according to claim 16.

* * * * *